US012633018B1

(12) United States Patent

Gandelsman

(10) Patent No.: US 12,633,018 B1

(45) Date of Patent: May 19, 2026

(54) MULTI-REFERENCE IMAGE EDITING DATA GENERATION VIA EMERGENT SIMILARITY METRICS IN IMAGE REPRESENTATION LEARNERS

(71) Applicant: Reve AI, Inc., Palo Alto, CA (US)

(72) Inventor: Yossi Gandelsman, Palo Alto, CA (US)

(73) Assignee: REVE AI, INC., Palo Alto, CA (US)

( * ) Notice: Subject to any disclaimer, the term of this patent is extended or adjusted under 35 U.S.C. 154(b) by 0 days.

(21) Appl. No.: 19/357,867

(22) Filed: Oct. 14, 2025

Related U.S. Application Data

(60) Provisional application No. 63/881,778, filed on Sep. 15, 2025.

(51) Int. Cl.
*G06T 11/60* (2006.01)
*G06V 20/70* (2022.01)

(52) U.S. Cl.
CPC .............. *G06T 11/60* (2013.01); *G06V 20/70* (2022.01)

(58) Field of Classification Search
None
See application file for complete search history.

(56) References Cited

U.S. PATENT DOCUMENTS

2023/0073843 A1 * 3/2023 Sampaio De Rezende ................. G06F 16/56

FOREIGN PATENT DOCUMENTS

WO WO-2024107884 A1 * 5/2024 ............. G06T 11/00

* cited by examiner

*Primary Examiner* — Tapas Mazumder
(74) *Attorney, Agent, or Firm* — Pillsbury Winthrop Shaw Pittman, LLP

(57) ABSTRACT

Systems and methods are disclosed for generating edit captions based on layout representations. The system may access one or more reference layout representations associated with one or more reference images and a target layout representation associated with a target image. The system may compare the one or more reference layout representations with the target layout representation to determine semantic differences or correspondences. The system may identify one or more differences between the one or more reference images and the target image, the differences including modifications to objects, spatial relationships, or contextual features. The system may generate one or more edit captions based on the identified differences. Each edit caption may comprise natural language text describing transformations between the one or more reference images and the target image, including instructions to add, remove, replace, reposition, or resize elements, or descriptions of contextual changes such as background, lighting, or perspective.

20 Claims, 10 Drawing Sheets

500

Access one or more reference layout representations and a target layout representation
502

Compare the one or more layout representations and the target layout representation
504

Identify one or more differences between the one or more reference images and the target image based on the comparison
506

Generate one or more edit captions based on the identified differences
508

"a clear plastic water bottle with a blue cap standing upright"

"a folded olive green wool blanked crumpled"

"a dark wood table surface"

"dried food inside the tin can"

"a silver metal tin can with a red and white label reading "EXPEDITION RATIONS""

TEXT: "Expedition Rations" Red and white label on the tin can

301

303

401A

401B

401C

403

500

Access one or more reference layout representations and a target layout representation
502

Compare the one or more layout representations and the target layout representation
504

Identify one or more differences between the one or more reference images and the target image based on the comparison
506

Generate one or more edit captions based on the identified differences
508

Figure 6:
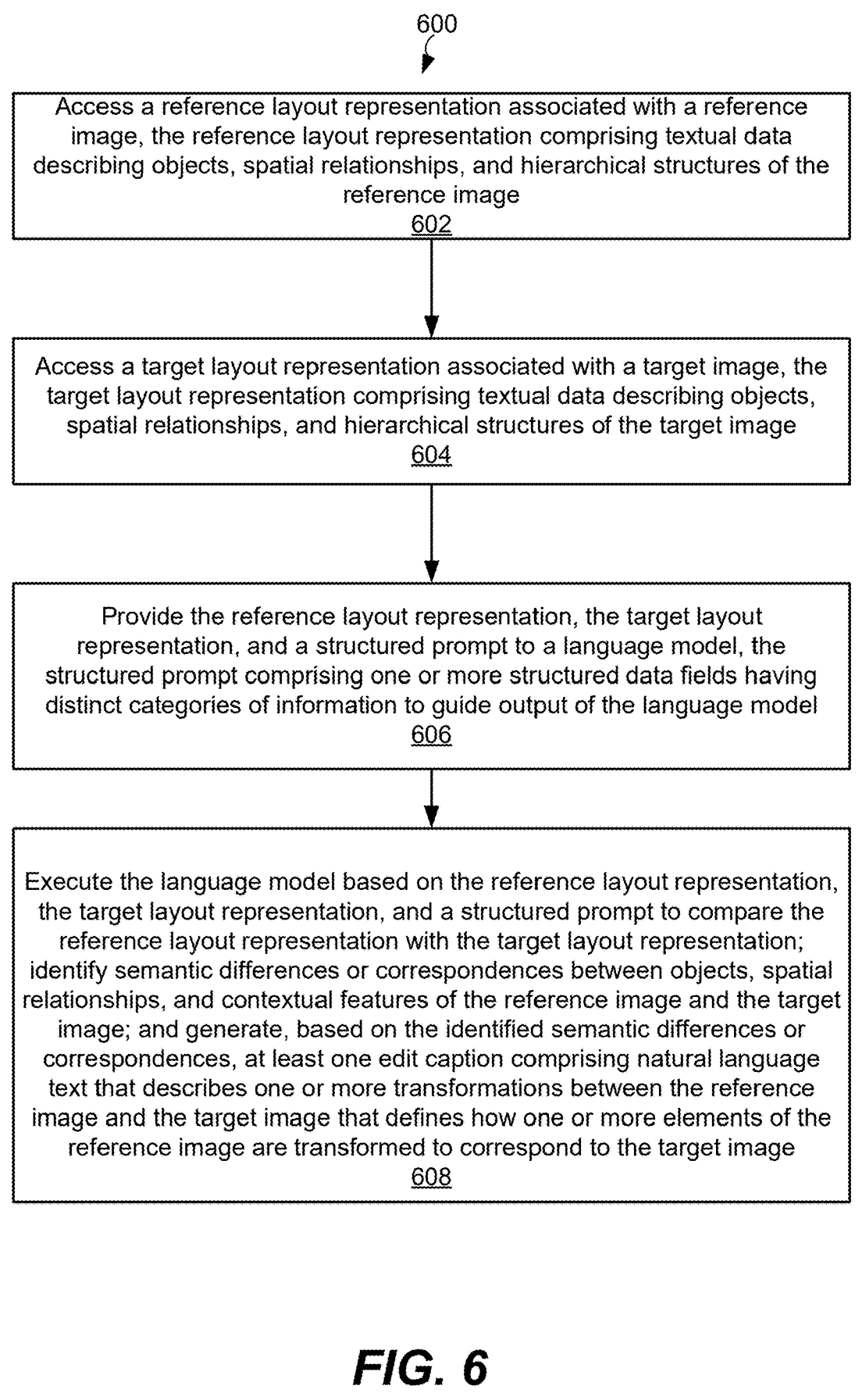

Access a reference layout representation associated with a reference image, the reference layout representation comprising textual data describing objects, spatial relationships, and hierarchical structures of the reference image
602

Access a target layout representation associated with a target image, the target layout representation comprising textual data describing objects, spatial relationships, and hierarchical structures of the target image
604

Provide the reference layout representation, the target layout representation, and a structured prompt to a language model, the structured prompt comprising one or more structured data fields having distinct categories of information to guide output of the language model
606

Execute the language model based on the reference layout representation, the target layout representation, and a structured prompt to compare the reference layout representation with the target layout representation; identify semantic differences or correspondences between objects, spatial relationships, and contextual features of the reference image and the target image; and generate, based on the identified semantic differences or correspondences, at least one edit caption comprising natural language text that describes one or more transformations between the reference image and the target image that defines how one or more elements of the reference image are transformed to correspond to the target image
608

Access a first reference layout representation comprising first textual data describing objects, spatial relationships, and hierarchical structures of a first reference image and a second reference layout representation comprising second textual data describing objects, spatial relationships, and hierarchical structures of a second reference image
702

Access a target layout representation associated with a target image, the target layout representation comprising textual data describing objects, spatial relationships, and hierarchical structures of the target image
704

Provide the first layout representation, the second layout representation, the target layout representation, and a structured prompt to a language model, the structured prompt comprising one or more structured data fields having distinct categories of information to guide output of the language model
706

Execute the language model based on the plurality of reference layout representations, the target layout representation, and the structured prompt to: determine correspondences between objects, spatial relationships, and contextual features of the first reference image, the second reference image, and the target image; and generate, based on the determined correspondences, at least one edit caption comprising natural language text that describes how one or more first elements from the first reference image and one or more second elements from the second reference image are combined, repositioned, or transformed to form the target image
708

FIG. 7

MULTI-REFERENCE IMAGE EDITING DATA GENERATION VIA EMERGENT SIMILARITY METRICS IN IMAGE REPRESENTATION LEARNERS

CROSS-REFERENCE TO RELATED APPLICATIONS

The subject application claims priority to U.S. Provisional Application No. 63/881,778, filed Sep. 15, 2025, the subject matter of which is incorporated herein by reference in entirety.

BACKGROUND

Image editing and manipulation tasks often require understanding the differences between images or describing how to combine multiple visual elements into a target composition. Traditional approaches to generating edit descriptions rely heavily on pixel-level analysis, computer vision models, and direct image comparison techniques, requiring substantial computational resources and sophisticated image processing pipelines.

More recently, Vision-Language Models (VLMs) have emerged as a promising approach for generating edit descriptions by directly processing image pixels alongside textual instructions. However, VLMs face several significant limitations when applied to edit captioning tasks. They require complex, high-resolution image inputs that result in substantial computational overhead and increased processing costs, particularly when processing multiple images simultaneously. Additionally, VLMs often struggle to focus on semantically meaningful differences, instead being distracted by minor pixel-level variations such as slight lighting changes, compression artifacts, or other visually apparent but semantically irrelevant differences.

SUMMARY

The disclosure relates to systems and methods for generating edit captions that describe semantic transformations between images by reasoning over structured text-based layout representations rather than raw pixel data. An input image may be processed by a layout extraction system that identifies salient regions, assigns bounding boxes, and generates textual descriptions of each region together with a global scene description. These layout representations encode spatial, hierarchical, and semantic relationships in text form, enabling downstream analysis by a language model without reliance on direct pixel-level processing.

In a single-reference image pair analysis mode, the system may receive a reference image and a target image. Each image may be converted into a respective layout representation that captures the objects and regions of the image. A captioning system may compare the layouts to identify semantic and spatial differences, and a language model may generate edit captions that describe the transformations necessary to convert one image into the other. The edit captions may specify objects to be added, removed, or replaced, may describe repositioning or resizing of elements, and may identify contextual changes such as modifications to background, lighting, or perspective. The system may produce outputs at multiple levels of detail, including concise commands, intermediate explanations, and extended descriptive narratives, thereby enabling flexibility across applications.

In a multi-reference image synthesis mode, the system may receive multiple reference images and a composite target image. Each reference image and the target image may be converted into layout representations. The captioning system may analyze correspondences between reference layouts and the target layout to determine how elements from the reference images have been combined to form the composite scene. Edit captions may be generated to explain this synthesis, including both general descriptions of the integration process and, in some configurations, explicit references to the source patches from which each element originated. This may enable precise attribution of visual components to their respective source images while supporting coherent reasoning about complex, multi-image compositions.

BRIEF DESCRIPTION OF THE DRAWINGS

Features of the present disclosure may be illustrated by way of example and not limited in the following figure(s), in which like numerals indicate like elements.

FIG. 5 illustrates an example of a method for automatically generating edit captions based on layout representations, according to an implementation.

FIG. 6 illustrates an example of a method for comparing a reference image and a target image using layout representations, according to an implementation.

FIG. 7 illustrates an example of a method for generating edit captions for multi-reference image synthesis, according to an implementation.

DETAILED DESCRIPTION

Figure 1:
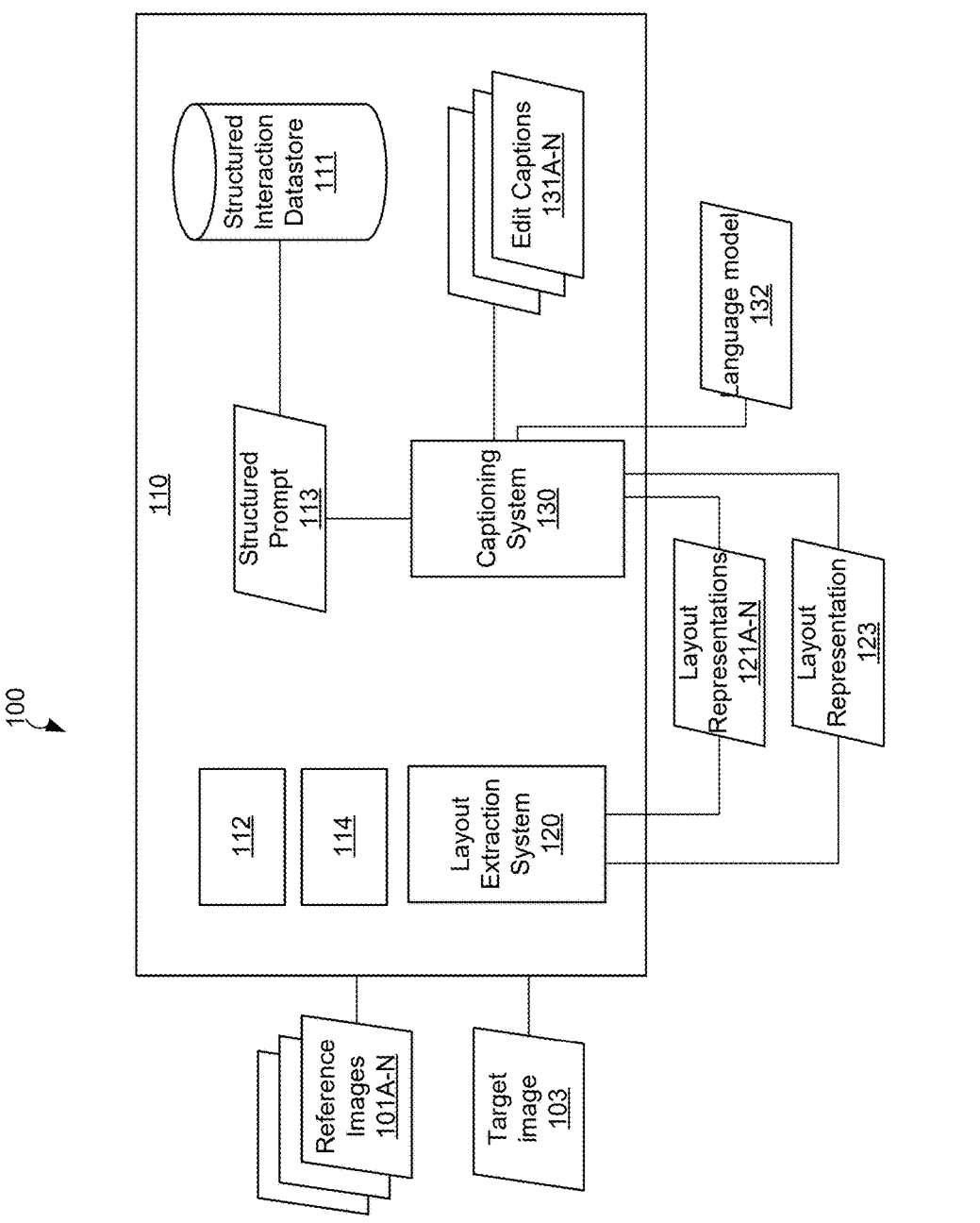
FIG. 1 illustrates an example of a system environment for captioning regions of an image based, according to an implementation.

FIG. 1 illustrates an example of a system environment 100 for generating edit captions based on layout representations, according to an implementation. The system environment 100 may include a computer system 110. The computer system 110 may include a processor 112, a memory 114, a layout extraction system 120, a captioning system 130, a structured interaction datastore 111, and/or other features.

A layout representation (such as layout representations 121, 123, 321, 421, 423) is a textual abstraction of an image that encodes global and/or localized semantic content in a machine-readable format. For example, a layout representation may include an overall image description, a regional elements list, and/or other content. The image description is a comprehensive description of the entire image, including scene context, lighting, perspective, and general composition. The image description is typically, though not necessarily, a natural language text description. The regional elements list may be a structured list of image regions. Each image region may include a type classification, parent-child relationships establishing spatial and semantic hierarchy, descriptive labels identifying the element, detailed descriptions of visual characteristics, and/or other image region data.

Figure 2A:
FIG. 2A illustrates an example of an image for which a layout representation is created, according to an implementation.
Figure 2B:
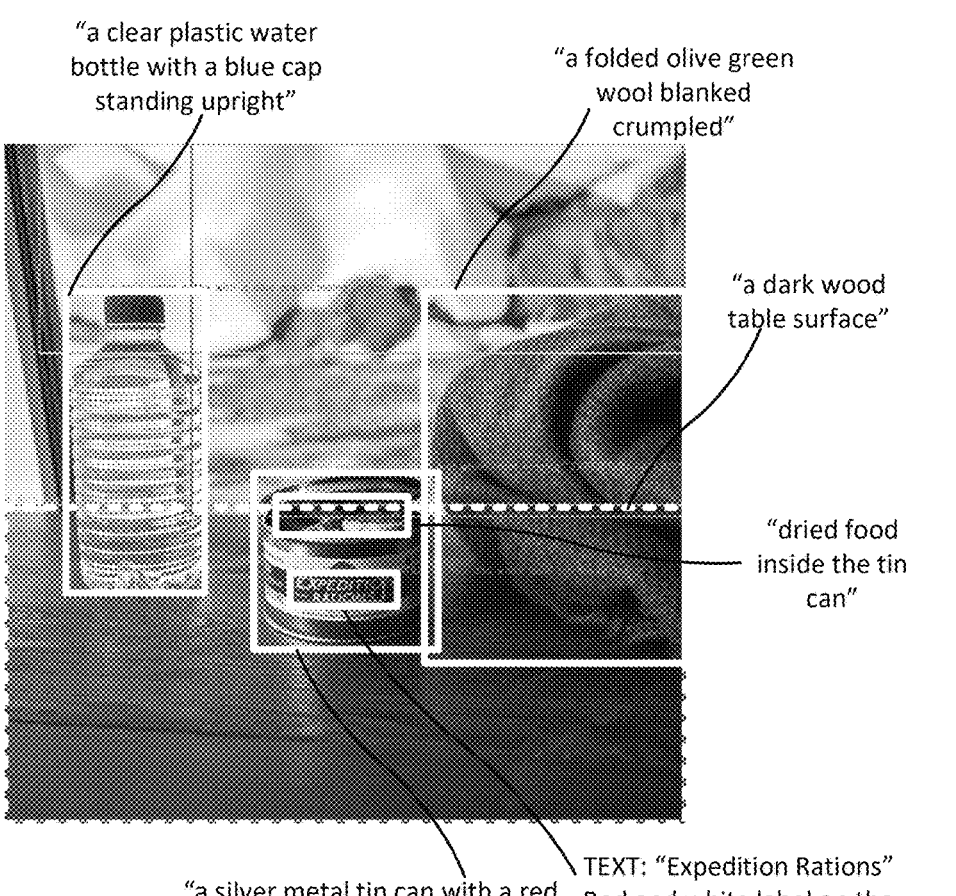
FIG. 2B illustrates an example of an image marked up to illustrate features of the layout representation created for the image illustrated in FIG. 2A, according to an implementation.

For example, FIG. 2A illustrates an example of an image for which a layout representation 121 is generated, according to an implementation. FIG. 2B illustrates an example of the image 201 from FIG. 2A showing data from the layout representation 121. In this example, the layout representation 121 may include an image description: "A still life photograph of Antarctic expedition rations arranged on a dark wooden table surface. A silver metal tin can with a red and white label reading 'EXPEDITION RATIONS' sits in the center, its lid slightly open revealing dried food blocks inside. To the left, a clear plastic water bottle with blue cap stands upright. A folded olive green wool blanket lies crumpled on the right side of the composition. The background features a blurred view of white ice formations and gray rock outcroppings through a window, with natural daylight illuminating the scene."

The image regions may include, in which "[bbox]" indicates a bounding box specification follows:

[bbox] a silver metal tin can with a red and white label reading "EXPEDITION RATIONS", its lid slightly open revealing dried food blocks inside: x0=0.372 y0=0.48399999999999993 x1=0.62 y1=0.744

[bbox] a clear plastic water bottle with a blue cap standing upright: x0=0.092 y0=0.22 x1=0.292 y1=0.664

[bbox] a folded olive green wool blanket crumpled on the right side: x0=0.616 y0=0.212 x1=0.996 y1=0.768

[bbox] white ice formations: x0=0.052 y0=0.0 x1=0.996 y1=0.308

[bbox] a dark wooden table surface: x0=0.0 y0=0.5320000000000001 x1=0.996 y1=0.996

[bbox] gray rock outcroppings: x0=0.276 y0=0.0 x1=0.996 y1=0.548

[bbox] dried food blocks inside the tin can: x0=0.396 y0=0.52 x1=0.592 y1=0.576

[bbox] Text: "EXPEDITION RATIONS". Red and white label on the tin can: x0=0.424 y0=0.636 x1=0.556 y1=0.672

This structured representation captures both the overall scene context and specific regional details in a format that enables sophisticated textual reasoning about spatial relationships, object correspondence, and semantic similarities without requiring pixel-level analysis. The bounding box information is illustrated in FIG. 2B.

Returning to FIG. 1, the layout extraction system 120 may process one or more reference images 101 (illustrated as reference images 101A-N) and a target image 103 to generate one or more layout representations 121 and 123, respectively (illustrated as layout representations 101A-N and 123). Each layout representation 121, 131 may include textual data describing objects, spatial relationships, and hierarchical structures of the corresponding image. An example of generating a layout representation is also described in U.S. Pat. No. 12,380,569, entitled "LAYOUT EXTRACTION SYSTEM FOR REGIONAL ANNOTATION OF IMAGES", issued on Aug. 5, 2025, the entirety of which is incorporated by reference in its entirety herein for all purposes.

The captioning system 130 may access the layout representations 121A-N and 123 and may apply a structured prompt 113 retrieved from the structured interaction datastore 111. The structured prompt 113 may comprise one or more structured data fields having distinct categories of information to guide output of the language model 132. The language model 132 may include one or more machine learning models configured to generate, process, or analyze natural language text. In some implementations, the language model 132 is a large language model (LLM) trained on structured and unstructured text corpora to perform tasks including, but not limited to, text generation, semantic comparison, summarization, classification, or reasoning over symbolic or structured inputs. The language model 132 may operate on input data comprising one or more layout representations, structured prompts, or other textual abstractions of image content, and may output edit captions, semantic explanations, or transformation instructions in natural language.

The language model 132 may execute based on the structured prompt 113 and the layout representations 121A-N and 123 to compare layouts, identify semantic differences or correspondences, and generate one or more edit captions 131A-N. The structured interaction datastore 111 may store structured prompts 113 and related data used by the captioning system 130 in cooperation with the language model 132. The structured interaction datastore 111 may also store edit captions 131A-N in association with the corresponding reference images 101A-N and the target image 103 for later retrieval.

Generating an Edit Caption from a Layout Representation and Structured Interactions The captioning system 130 may generate an edit caption 131 based on an input layout representation 121, 123 and a structured prompt, such as from the structured interaction datastore 111. A structured prompt 113 may be a machine-readable input provided to a language model 132, the input having a defined structure that organizes content into structured data fields having distinct categories of information, thereby guiding the language model 132 to process each category according to its intended function in support of generating an edit caption 131. Unlike an unstructured natural language query, a structured prompt may include one or more delimiters, tags, and/or other formatting that designate the structured data fields. The structure of the prompt enables consistent interpretation by the language model and supports generation of outputs aligned with the designated fields. An example of the structured data fields is illustrated in Table 1 below, along with descriptions of each field.

Table 1. Example of a structured prompt 113 in which data fields are delimited by respective tags "< >" and "</>." In the illustrated example, the tags and corresponding data fields are: "sys", "edit_context", "reasoning", "explanation", and "edit_command." Other tags and corresponding data fields may be used as well.

The edit caption 131 may be generated at multiple levels of detail, including a concise instruction format (short caption), a more descriptive explanatory format (medium caption), and an extended narrative with contextual details (long

```
<sys> system prompt for edit caption generation </sys>
<edit_context> original layout and edited layout descriptions </edit_context>
<reasoning> analytical reasoning data </reasoning>
<explanation> detailed analysis relating to reasoning data </explanation>
<edit_command> transformation instructions in short, medium, and long formats
</edit_command>
```

The specific data field values encoded by the structured prompt 113 will vary depending on the specific image analysis/generation task. For example, a single reference image pair analysis task is illustrated in Table 2, and FIGS. 3A, 3B, and 3C. A multi-reference image synthesis task is illustrated in Table 3, and FIGS. 4A, 4B, 4C, 4D, and 4E.

The captioning system 130 may provide the layout representation 121 and the structured prompt 113 to one or more language models 132, which generates an edit caption 131. An edit caption 131 is a description (usually but not necessarily natural language text) that specifies semantic transformations between a reference image or set of images and a target image or intended composite scene. In particular, an edit caption may: identify elements to be removed, replaced, repositioned, or added; describe changes in spatial arrangement, scale, proportion, or hierarchy among elements; specify modifications to contextual factors such as background, lighting, perspective, or time of day; and/or include other data relating to one or more analyzed images.

In some examples, an edit caption 131 may provide descriptions at varying levels of detail, such as concise summaries ("short" format), intermediate explanations ("medium" format), extended narratives ("long" format), and/or other level of detail. The content of edit captions 131 may vary depending on the image task. For example, edit captions 131 may convey, in human-readable form, the modifications required to convert one visual depiction into another, or to synthesize a new composition from multiple visual sources, without reliance on pixel-level change data. An edit caption 131 generated by the captioning system 130 may be used in various ways based on different modes of operation of the computer system 110.

Edit Captions in Single-Reference Image Pair Analysis

Figure 3A:
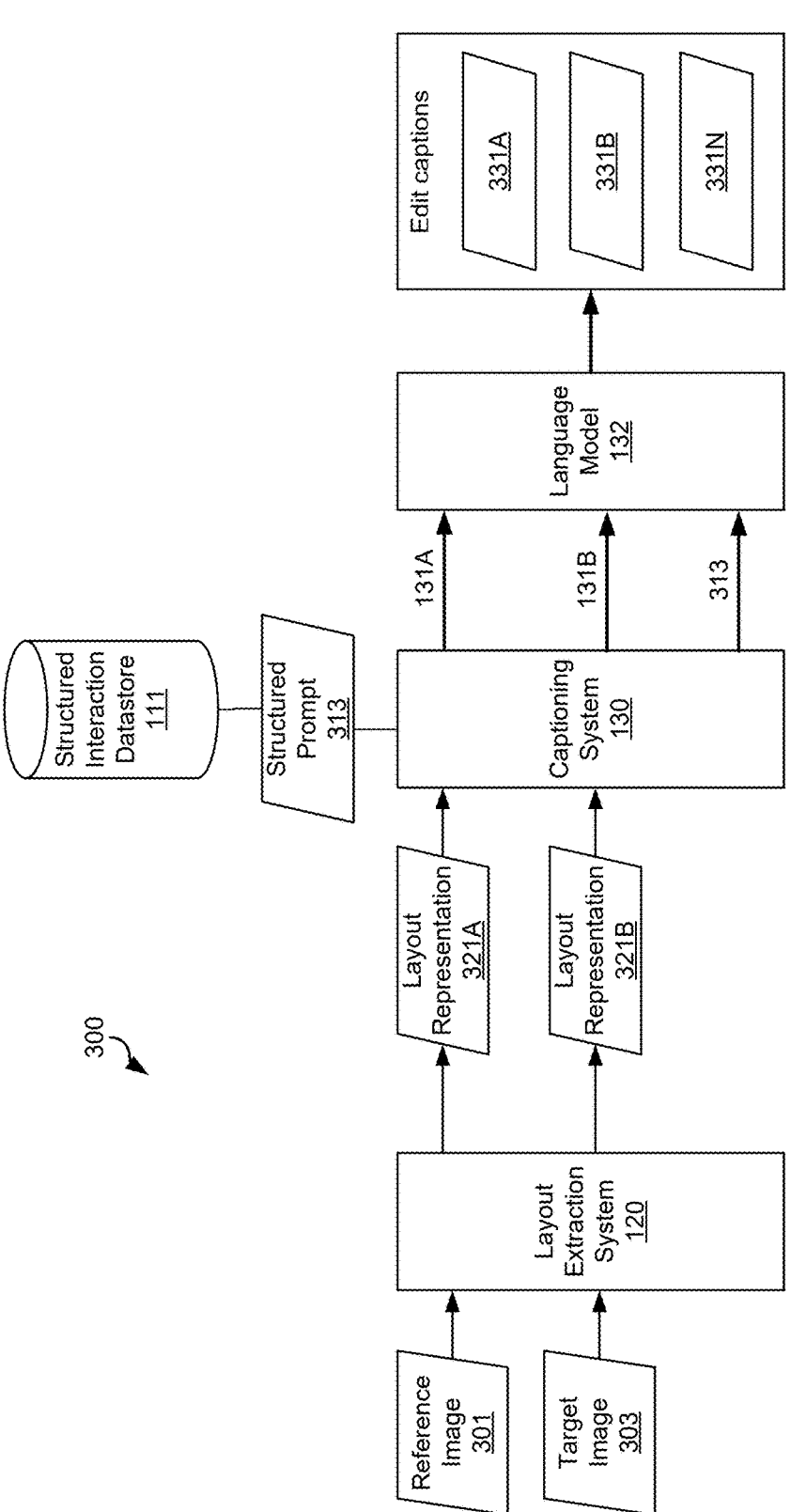
FIG. 3A illustrates an example of a data flow for single-reference image pair analysis in the system environment illustrated in FIG. 1, according to an implementation.
Figure 3B:
FIG. 3B illustrates an example of a reference image for single-reference image pair analysis with a target image illustrated in FIG. 3C, according to an implementation.
Figure 3C:
FIG. 3C illustrates an example of a target image for single-reference image pair analysis comparison with the reference image illustrated in FIG. 3B, according to an implementation.

For example, in single-reference image pair analysis, the edit caption 131 may provide an explanation of how one image (reference image) was changed with respect to another image (target image), as illustrated in FIGS. 3A, 3B, and 3C. In particular, in single-reference image pair analysis, an edit caption 131 may describe semantic transformations between a reference image and a target image. The captioning system 130, in cooperation with the language model 132, may receive a reference layout representation (such as 321A) and a target layout representation (such as 321B). The system may compare the two layout representations to identify semantic differences or correspondences, such as additions, removals, replacements, or repositioning of objects, as well as contextual modifications.

The edit caption 131 may then express these differences in natural language text. For example, an edit caption 131 may specify that two rocks glasses in the reference image are replaced with an Old Fashioned and a highball in the target image, that the surface is changed from a dark table to a wooden railing, and that the background is modified from a daytime scene to a dusk-lit patio with string lights.

caption). A short caption may comprise a concise instruction that summarizes the transformations between images in a few words or phrases. For example, a short caption may specify "replace two glasses with an Old Fashioned and a highball, move to a wooden railing, and change the background to a dusk patio." Short captions may be advantageous when a brief, high-level summary is sufficient, such as for quick indexing, metadata tagging, or downstream systems that require minimal natural language processing.

A medium caption may provide more descriptive explanations of the transformations, typically expressed in complete sentences. For example, a medium caption may specify that "the two rocks glasses are replaced with an Old Fashioned and a highball, the surface is changed from a dark table to a wooden railing, and the background is updated to a patio with string lights at dusk." Medium captions may be useful for applications such as natural language search, user-facing editing instructions, or contexts requiring moderate detail without overwhelming verbosity.

A long caption may provide extended narrative descriptions of the differences and transformations, often including contextual information about objects, spatial positioning, lighting, and background elements. For example, a long caption may describe in detail how each object is removed, replaced, or repositioned, and may narrate broader scene changes such as a shift from daylight to dusk with string lights illuminating a patio. Long captions may be valuable in use cases where comprehensive semantic detail is needed, such as human-readable documentation, training data for vision-language models, or instructing generative image models with high precision.

Generating edit captions at multiple levels of detail provides flexibility across applications. Short captions enable efficiency and compactness, medium captions balance brevity with expressiveness, and long captions support exhaustive semantic detail. By offering captions at different levels, the system ensures that the textual outputs can be tailored to both human and machine consumers, supporting tasks ranging from quick summarization to detailed compositional reasoning.

By structuring differences in textual form, the edit caption 131 enables semantically meaningful explanations of image transformations without reliance on pixel-level change detection, thereby improving efficiency and robustness to minor visual noise Edit Captions in Multi-Reference Image Synthesis In multi-reference image synthesis, the computer system 110 may generate an edit caption 131 that describes how elements from two or more reference images are combined to form a composite target image. Each edit caption 131 may be generated by the captioning system 130 in cooperation with the language model 132 based on a plurality of reference layout representations (such as 121A-N) and a target layout representation (such as 123).

The edit caption 131 may specify, in natural language, which elements of the reference images are integrated into the target image and how those elements are transformed to produce a coherent composition. For example, the edit caption 131 may indicate that a sofa from a first reference image is positioned against a wall, a rug from a second reference image is placed on the floor, and a table from a third reference image is centered on the rug.

The edit caption 131 may be generated in multiple forms. In one form, the edit caption may provide general transformation instructions without explicit references to the source patches (<edit_command>). In another form, the edit caption may include explicit identifiers (<edit_command_with-refs>) that tag elements with their originating reference images, thereby enabling traceable attribution of visual content.

By describing transformations in textual form, the edit caption 131 enables semantic reasoning about image synthesis without requiring pixel-level comparison. The captions may then be used to inform downstream image generation models, indexing systems, or editing tools to produce or track composite images. An example of multi-reference image synthesis is illustrated in FIGS. 4A, 4B, 4C, 4D, and 4E.

Similar to image pair analysis, the edit captions 131 may be produced at varying levels of detail, including at least a short caption, a medium caption, and a long caption. A short caption may provide a concise statement identifying that multiple elements from different reference images are merged into a composite target image. For example, a short caption may specify "combine the sofa from the first image, the rug from the second image, and the table from the third image into a single living room scene." Short captions may be advantageous for quick attribution, indexing, or summarization of composite image synthesis.

A medium caption may provide more descriptive text identifying both the source of each element and its placement in the composite scene. For example, a medium caption may specify "the yellow sofa from the first image is placed against the wall, the red rug from the second image is laid on the floor, and the wooden table from the third image is positioned in the center of the rug." Medium captions may be useful for applications that require explicit element-level attribution and spatial positioning while maintaining conciseness.

A long caption may provide an extended narrative explaining not only the sources and placements of elements but also the contextual integration of the composite scene.

For example, a long caption may describe in detail how the sofa, rug, and table from their respective reference images are integrated into a unified living room environment, maintaining scale, lighting consistency, and realistic spatial relationships. Long captions may be valuable for human-readable documentation, training data for composite scene generation, or as detailed textual prompts for generative image models.

Providing edit captions at multiple levels of detail in the multi-reference mode ensures flexibility across use cases.

Short captions support efficient summarization, medium captions provide clear attribution and placement instructions, and long captions deliver comprehensive semantic narratives that facilitate accurate and explainable multi-image synthesis. By producing layered outputs, the system accommodates both lightweight applications such as metadata tagging and more advanced applications such as detailed compositional reasoning and guided image generation.

Single-Reference Image Pair Analysis

FIG. 3A illustrates an example of a data flow 300 for single-reference image pair analysis in the system environment 100 illustrated in FIG. 1, according to an implementation. FIG. 3B illustrates an example of a reference image 301 for single-reference image pair analysis with a target image illustrated in FIG. 3C, according to an implementation. FIG. 3C illustrates an example of a target image 303 for single-reference image pair analysis comparison with the reference image illustrated in FIG. 3B, according to an implementation.

The data flow 300 may generate one or more edit captions 331 (illustrated as edit captions 331A, 331B, . . . 331N). Each edit caption 331 may describe differences between the pair of images at varying levels of detail. The pair of images may include a reference image 301 and a target image 303. The reference image 301 and the target image 303 may be provided as inputs to a layout extraction system 120. The layout extraction system 120 may process the reference image 301 and the target image 303 to produce structured layout representations 321A and 321B, respectively. Each layout representation 321 may capture semantic and spatial information of visual elements present within the corresponding image. For example, the layout representations 321A and 321B may capture semantic and spatial information of visual elements present within the reference image 301 and the target image 303, respectively.

The captioning system 130 may receive as inputs the layout representations 321A and 321B and a structured prompt 313. The captioning system 130 may access the structured prompt 313 from the structured interaction datastore 111. The structured prompt 313 includes instructions analyze differences between original and edited layouts while considering that layout representations may contain imperfections from the image parsing process. The structured prompt 313 is used to execute a structured interaction with the language model 132.

Table 2 illustrates an example of a structured prompt 313 for single-reference image pair analysis.

```
<sys> system prompt for edit caption generation </sys>
<edit_context> original layout and edited layout descriptions </edit_context>
<reasoning> analytical reasoning about the differences </reasoning>
<explanation> detailed analysis of layout differences </explanation>
<edit_command> transformation instructions in short, medium, and long formats
</edit_command>
```

The captioning system 130 may interface with a language model 132 to analyze differences between the reference image 301 and the target image 303 using the respective layout representations 321A and 321B. For example, the captioning system 130 may generate the one or more edit captions 331 based on the structured prompt 313, layout representations 321A and 321B, and reasoning capabilities of the language model 132. Each edit caption 331 may describe the modifications, transformations, or differences necessary to convert the reference image 301 into the target image 303, or vice versa. In some examples, the language model 132 is specifically instructed to treat elements with similar features as likely being the same element across images, accounting for minor variations in color, lighting, or positioning that may result from layout parsing errors. This may be to generate robust edit description generation within an edit caption 331 even when layout representations 321 may be imperfect.

In some examples, the edit captions 331 may include different levels of detail. For example, an edit caption 331A may include a short caption, an edit caption 331B may include a medium caption, and edit caption 331N may include a long caption. Additionally, or alternatively, other edit captions with different levels of detail may be generated. Given the input images illustrated in FIGS. 3B and 3C, the captioning system 130 may generate edit captions 331A, 331B, and 331N.

Table 3 illustrates examples of edit captions 331A, 331B, and 331N for reference image 301 and target image 303.

---

Short (Edit Caption 331A): Change the drinks to an Old Fashioned and a highball, place them on a wooden railing, and change the background to a string-lit patio at dusk.
Medium (Edit Caption 331B): Replace the two rocks glasses and cherry cocktail with an Old Fashioned and a highball, set the scene on a wooden railing instead of a dark table, and transform the background into a patio with string lights and a brick wall at dusk.
Long (Edit Caption 331N): Update the scene by removing the two rocks glasses of bourbon and the cocktail glass with cherries and a stirrer, and instead feature an Old Fashioned with ice and an orange slice, and a highball filled with ice and a black straw. Move the entire setup from the dark, round table to a wooden railing. Change the background from an out-of-focus outdoor gathering in daylight to a blurred patio area with wooden tables, metal chairs, large tan umbrellas, and a brick wall covered in greenery, all illuminated by string lights under warm, diffuse dusk lighting.

---

By using the layout representations 321 and language model 132, the captioning system 130 may thereby provide semantically meaningful textual explanations of image transformations between the reference image 101 and the target image 103 without reliance on pixel-level processing.

Multi-Reference Image Synthesis

Figure 4A:
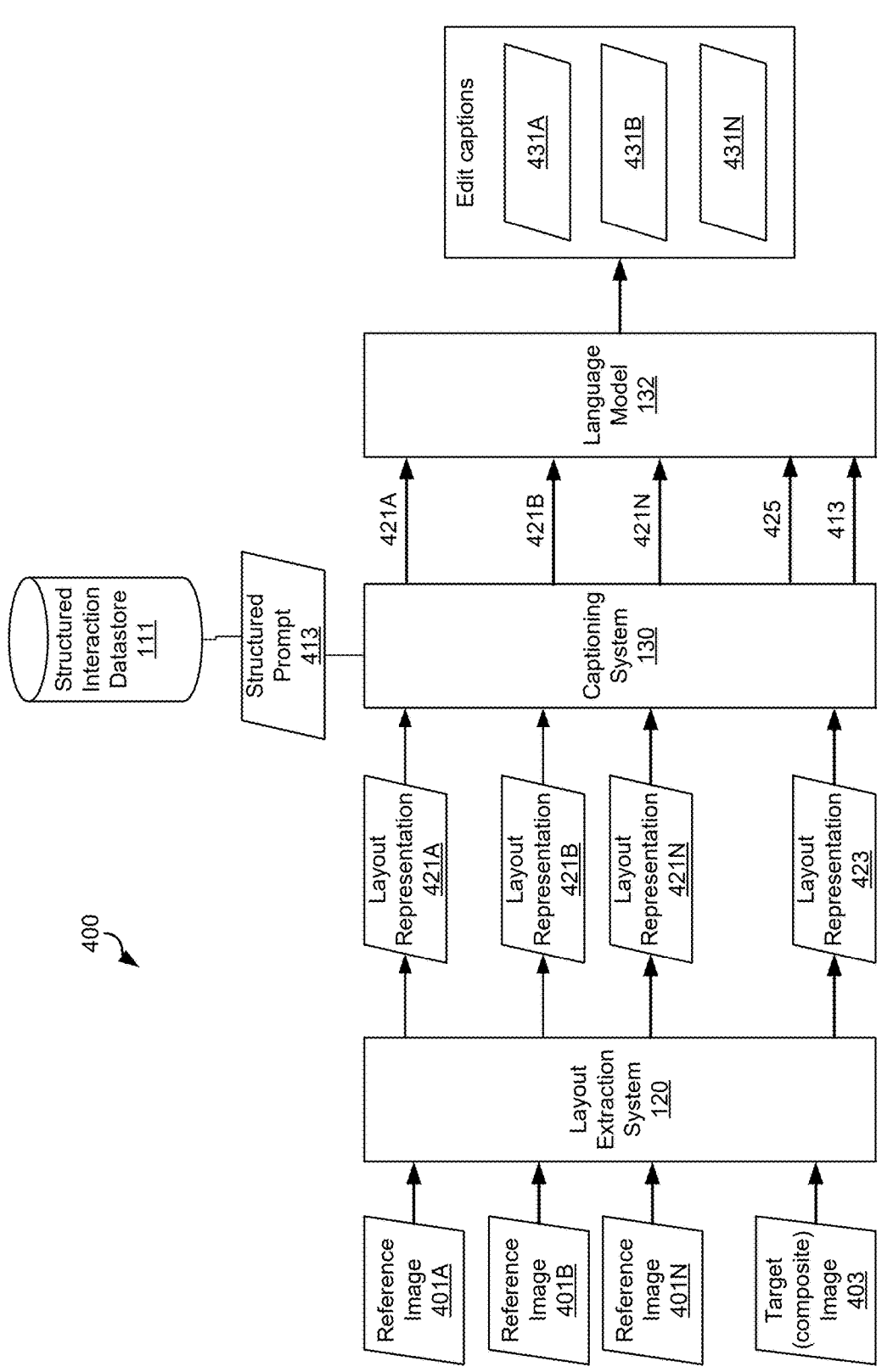
FIG. 4A illustrates an example of a data flow for multi-reference image synthesis in the system environment illustrated in FIG. 1, according to an implementation.

FIG. 4A illustrates an example of a data flow 400 for multi-reference image synthesis in the system environment The layout extraction system 120 may process the reference images 401A, 401B, and 401C and the target image 403 to produce structured layout representations 421A, 421B, 421C, and 423, respectively. Each layout representation 421A-C and 423 may capture semantic and spatial information of visual elements present within the corresponding image. For example, the layout representations 421A, 421B, 421C, and 423 may capture semantic and spatial information of visual elements present within the reference images 401A, 401B, 401C, and target image 403, respectively.

The captioning system 130 may receive as inputs the layout representations 421A, 421B, 421C, and 423, and a structured prompt 413. The captioning system 130 may access the structured prompt 413 from the structured interaction datastore 111. The structured prompt 413 includes instructions analyze differences between original and edited layouts while considering that layout representations may contain imperfections from the image parsing process. The structured prompt 413 is used to execute a structured interaction with the language model 132.

Table 4 illustrates an example of a structured prompt 413 for multi-reference image synthesis.

---

```
<sys> system prompt for multi-reference editing </sys>
<edit_context> input image patch captions and output image layout </edit_context>
<reasoning> analysis of element correspondence </reasoning>
<explanation> description of how input patches contribute to output </explanation>
<edit_command> transformation instructions without references </edit_command>
<edit_command_withrefs> transformation instructions with explicit patch references </edit_command>
```

---

Figure 4B:
FIG. 4B illustrates an example of a first reference image for multi-reference image synthesis, according to an implementation.
Figure 4C:
FIG. 4C illustrates an example of a second reference image for multi-reference image synthesis, according to an implementation.
Figure 4D:
FIG. 4D illustrates an example of a third reference image for multi-reference image synthesis, according to an implementation.
Figure 4E:
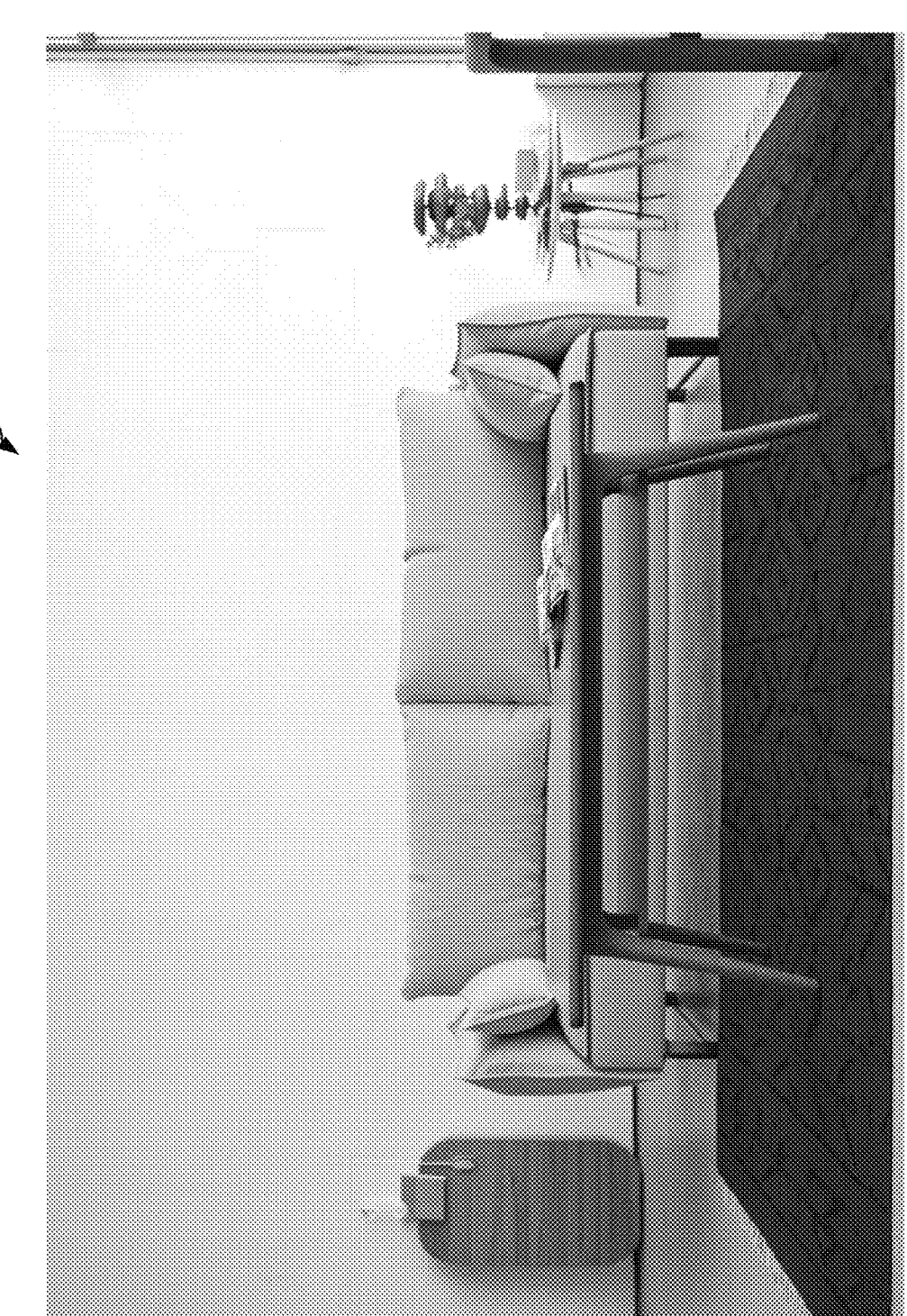
FIG. 4E illustrates an example of a target image that serves as a composite image for multi-reference image synthesis along with the first, second, and third reference images, according to an implementation.

100 illustrated in FIG. 1, according to an implementation. FIG. 4B illustrates an example of a first reference image 401A for multi-reference image synthesis, according to an implementation. FIG. 4C illustrates an example of a second reference image 401B for multi-reference image synthesis, according to an implementation. FIG. 4D illustrates an example of a third reference image 401D for multi-reference image synthesis, according to an implementation. FIG. 4E illustrates an example of a target image 403 that serves as a composite image for multi-reference image synthesis along with the first, second, and third reference images, according to an implementation.

The data flow 400 may generate one or more edit captions 431 (illustrated as edit captions 431A, 431B, . . . 431N). Each edit caption 431 may describe how to merge or combine the reference images 401A, 401B, and 401C to create the target image 403 (composite image).

In some examples of multi-reference image synthesis, the captioning system 130 may generate two or more versions of edit commands: one with general descriptions and another with explicit XML-tagged references to specific input patches (e.g., "the brown hat from <id>0</id>"). Based on the layout representations 421A, 421B, 421C, and 423 of the reference images illustrated in FIGS. 4B, 4C, 4D, and the target (composite) image illustrated in FIG. 4E, the captioning system 130 may generate one or more edit captions 431 (illustrated as edit captions 431A, 431B, 431N).

Table 5 illustrates examples of edit captions 431A, 431B, and 431N for reference image 401A, 401B, 401N, and the target image 403.

Short Caption (edit caption 431A): Three individual furniture pieces from </0>, </1>, and </2> are combined into a single living room scene </3>.

Medium Caption (edit caption 431B): The yellow couch from </0>, red geometric rug from </1>, and wooden coffee table from </2> are repositioned and integrated into a unified interior space </3>, with the couch against the wall, rug on the floor, and table centered on the rug.

Long Caption (edit caption 431N): This composition takes three studio-photographed furniture pieces - the yellow upholstered sofa from </0>, the red patterned area rug from </1>, and the wooden coffee table from </2> - and transforms them into a complete living room interior </3>. The sofa is positioned against a white wall, the rug is laid flat on the floor beneath the seating area, and the coffee table is placed at an appropriate distance from the couch and centered on the rug. The transformation maintains each piece's original characteristics while establishing realistic spatial relationships, consistent lighting, and proper proportions within the unified room setting.

FIG. 5 illustrates an example of a method 500 for automatically generating edit captions based on layout representations, according to an implementation. At 502, the method 500 may access one or more reference layout representations (such as layout representations 121A, 121B, 321A, 421A, 421B, 421C, or 431B-431D) and a target layout representation (such as layout representation 321B or 423). Each reference layout representation may be associated with a respective reference image (such as reference image 301 or reference images 401A-401C) and may comprise textual data describing objects, spatial relationships, and hierarchical structures of the reference image. The target layout representation may similarly comprise textual data describing objects, spatial relationships, and hierarchical structures of the target image (such as target image 303 or 403).

At 504, the method 500 may compare the one or more reference layout representations with the target layout representation. The comparison may analyze correspondences and differences between objects, their spatial positions, and contextual features across the reference images and the target image.

At 506, the method 500 may identify one or more differences between the one or more reference images (such as reference image 301 or reference images 401A-401C) and the target image (such as target image 303 or 403) based on the comparison of the layout representations (321A-321B, 421A-421C, 423). The differences may include semantic variations, spatial modifications, or contextual changes, such as object repositioning, resizing, or background modification.

At 508, the method 500 may generate one or more edit captions (such as edit captions 331A-331N or 431A-431N) based on the identified differences. Each edit caption may comprise natural language text describing the transformations between the one or more reference images and the target image. In some examples, the edit captions may describe how a single reference image is transformed into the target image in a pairwise mode (FIGS. 3A-3C), or how elements from multiple reference images are combined to form a composite target image in a multi-reference mode (FIGS. 4A-4E).

FIG. 6 illustrates an example of a method 600 for comparing a reference image and a target image using layout representations, according to an implementation. At 602, the method 600 may include accessing a reference layout representation associated with a reference image, the reference layout representation comprising textual data describing objects, spatial relationships, and hierarchical structures of the reference image. For example, the layout extraction system 120 may perform this operation.

At 604, the method 600 may include accessing a target layout representation associated with a target image, the target layout representation comprising textual data describing objects, spatial relationships, and hierarchical structures of the target image. For example, the layout extraction system 120 may perform this operation.

At 606, the method 600 may include providing the reference layout representation, the target layout representation, and a structured prompt to a language model, the structured prompt comprising one or more structured data fields having distinct categories of information to guide output of the language model. For example, the captioning system 130 may perform this operation.

At 608, the method 600 may include executing the language model based on the reference layout representation, the target layout representation, and the structured prompt to compare the reference layout representation with the target layout representation; identify semantic differences or correspondences between objects, spatial relationships, and contextual features of the reference image and the target image; and generate, based on the identified semantic differences or correspondences, at least one edit caption comprising natural language text that describes one or more transformations between the reference image and the target image that defines how one or more elements of the reference image are transformed to correspond to the target image. For example, the captioning system 130 executing the language model 132 may perform this operation.

FIG. 7 illustrates an example of a method 700 for generating edit captions for multi-reference image synthesis, according to an implementation.

At 702, the method 700 may include accessing a first reference layout representation comprising first textual data describing objects, spatial relationships, and hierarchical structures of a first reference image, and a second reference layout representation comprising second textual data describing objects, spatial relationships, and hierarchical structures of a second reference image. For example, the layout extraction system 120 may perform this operation.

At 704, the method 700 may include accessing a target layout representation associated with a target image, the target layout representation comprising textual data describing objects, spatial relationships, and hierarchical structures of the target image. For example, the layout extraction system 120 may perform this operation.

At 706, the method 700 may include providing the first layout representation, the second layout representation, the target layout representation, and a structured prompt to a language model, the structured prompt comprising one or more structured data fields having distinct categories of information to guide output of the language model. For example, the captioning system 130 may perform this operation.

At 708, the method 700 may include executing the language model based on the plurality of reference layout representations, the target layout representation, and the structured prompt to compare the reference layout representation with the target layout representation; identify semantic differences or correspondences between objects, spatial relationships, and contextual features of the reference image and the target image; and generate, based on the identified semantic differences or correspondences, at least one edit caption comprising natural language text that describes one or more transformations between the reference image and the target image that defines how one or more elements of the reference image are transformed to correspond to the target image. For example, the captioning system 130 executing the language model 132 may perform this operation.

Examples of Uses of Edit Captions

The computer system 110 may be programmed to use edit captions 131 for a variety of downstream tasks. In some implementations, the computer system 110 may be programmed to provide an edit caption 131 to a generative image model. The generative image model may be conditioned on the text of the edit caption 131 to produce a modified or composite image. For example, in inference, the computer system 110 may apply an edit caption 131 to a reference image so that the generative image model produces a target image that reflects the described transformations. In training, the computer system 110 may pair edit captions 131 with corresponding reference and target images to provide supervision, thereby enabling a generative model or language model to learn to associate textual edit instructions with semantic visual changes.

In some examples, the computer system 110 may use edit captions 131 for attribution and provenance. The computer system 110 may store an edit caption 131 in association with the corresponding reference and target images so that the edit caption 131 provides a record of how one image was modified with respect to another. In a multi-reference mode, the computer system 110 may store edit captions 131 that include explicit identifiers of source elements, thereby enabling traceable attribution of each element of a composite target image back to its originating reference image.

In some examples, the computer system 110 may index edit captions 131 for search and retrieval. Because the captions are expressed in natural language, the computer system 110 may allow users to query for edits or composites using textual descriptions, such as "replace two glasses with a highball and an Old Fashioned." The computer system 110 may then return images, edit captions, or associated metadata that satisfy the query.

The specific role of the edit captions 131 may vary depending on the operational mode. In the pairwise mode, the computer system 110 may generate and use edit captions 131 to describe semantic transformations necessary to modify a single reference image into a target image. In the multi-reference mode, the computer system 110 may generate and use edit captions 131 to describe how elements from two or more reference images are combined into a composite target image, including both general instructions and explicit attributions to source patches.

In some examples, the computer system 110 may generate and consume edit captions 131 at multiple levels of detail. Short captions may be used to provide concise summaries for metadata tagging or rapid indexing. Medium captions may provide balanced, descriptive instructions suitable for guiding editing or search. Long captions may provide detailed, narrative descriptions suitable for training data, documentation, or conditioning of generative image models. By supporting multiple levels of detail, the computer system 110 may adapt the same underlying transformation data to different applications, ranging from lightweight semantic indexing to high-fidelity generative synthesis.

The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some implementations, processor 112 may comprise a plurality of processing units. These processing units may be physically located within the same device, or processor 112 may represent processing functionality of a plurality of devices operating in coordination. Some or all processing units may be on-site within a computational facility and/or be located remotely such as at a cloud-based computing facility. The memory 114 may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The computer system 110 may access a model API endpoint, which may be an API that provides an interface to one or more of the models. The system may activate a model via the model API endpoint. For example, to activate a model, the computer system 110 may generate or select a prompt via a prompt generator and transmit the prompt as input via the model API endpoint. The prompt generator may be a system component that receives an input and generates a prompt for execution by one or more of the models.

The disclosed approach provides several advantages over conventional vision-language models and pixel-based methods. The system operates entirely on textual layout representations without accessing pixel data, enabling efficient processing and reduced computational requirements. Hierarchical layouts with parent-child relationships and type classifications allow for sophisticated spatial and semantic reasoning. By avoiding high-resolution image processing, the system reduces computational costs while maintaining high-quality edit description generation. The text-based approach demonstrates resistance to semantic noise by ignoring minor pixel-level variations, such as lighting differences or compression artifacts, and instead focusing on meaningful transformations. The system further accounts for imperfections in layout extraction by treating minor variations as potentially identical elements and concentrating on substantive differences. Edit captions are produced in multiple levels of detail, providing flexibility for different use cases. In multi-reference scenarios, the system maintains explicit links between edit commands and source image patches, ensuring traceable and precise attribution of visual elements.

Text-based approaches may offer various advantages over direct pixel processing: simpler input representations, lower computational costs, and improved ability to ignore semantically irrelevant pixel-level variations that often confuse vision-based systems.

Prompts can be in the form of a text prompt for models that can understand text inputs, machine prompts for models that can understand non-text such as vector inputs, and/or other types of prompts depending on the model for which the prompt is intended.

In some instances, the prompt generator may access one or more preconfigured prompts that may be designed by a developer and/or historical prompts previously generated by one or more users. In these instances, the prompt generator may provide a user-selectable listing of the preconfigured prompts. Preconfigured prompts may be advantageous in situations in which a prompt is found to be effective and can be re-used by the same or different users and/or to simplify and streamline prompts. In some instances, the prompt generator may modify a preconfigured prompt for dynamic prompt generation based on the preconfigured prompt.

To obtain an input image (if accessed from a network, for example), the computer system 110 may use a system API to provide upload capabilities for client devices. This data upload or access may be made via Java Database Connectivity (JDBC), Representational state transfer (RESTful) services, Simple Mail Transfer Protocol (SMTP) protocols, direct file upload, and/or other file transfer services or techniques. In particular, the system API may include a MICROSOFT SHAREPOINT API Connector, an Hyper Text Transfer Protocol (HTTP)/HTTP-secure (HTTPS), a Network Drive Connector, a File Transfer Protocol (FTP) Connector, SMTP Artifact Collector, Object Store Connector, MICROSOFT ONEDRIVE Connector, GOOGLE DRIVE Connector, DROPBOX Connector, and/or other types of connector interfaces.

The computer system 110 may be connected to one other devices or services via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions one or more client devices. The data conveying the predictions may be a user interface generated for display at the one or more client devices, one or more messages transmitted to the one or more client devices, and/or other types of data for transmission. Although not shown, the one or more client devices may each include one or more processors.

The datastores and data stores described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific implementations described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system features illustrated in the Figures.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for automatically generating edit captions based on layout representations, comprising:
    a processor programmed to:
    access a reference layout representation associated with a reference image, the reference layout representation comprising textual data describing objects, spatial relationships, and hierarchical structures of the reference image;
    access a target layout representation associated with a target image, the target layout representation comprising textual data describing objects, spatial relationships, and hierarchical structures of the target image;
    provide the reference layout representation, the target layout representation, and a structured prompt to a language model, the structured prompt comprising one or more structured data fields having distinct categories of information to guide output of the language model;
    execute the language model based on the reference layout representation, the target layout representation, and the structured prompt to:
    compare the reference layout representation with the target layout representation;
    identify semantic differences or correspondences between objects, spatial relationships, and contextual features of the reference image and the target image; and
    generate, based on the identified semantic differences or correspondences, at least one edit caption comprising natural language text that describes one or more transformations between the reference image and the target image that defines how one or more elements of the reference image are transformed to correspond to the target image.

2. The system of claim 1, wherein the edit caption comprises: (i) instructions to add, remove, replace, reposition, or resize objects; (ii) descriptions of contextual modifications including background, lighting, or perspective changes; and/or (iii) synthesis explanations.

3. The system of claim 1, wherein the processor is further programmed to:
    access the reference image and/or the target image; and
    generate, based on a layout extraction system, the reference layout representation and/or the target layout representation.

4. The system of claim 1, wherein the processor is programmed to generate at least a first edit caption and a second edit caption, the first edit caption and the second edit caption having different levels of detail with respect to one another.

5. The system of claim 1, wherein the processor is programmed to generate the structured prompt comprising a system instruction for edit caption generation, layout descriptions of the reference image and the target image, analytical reasoning data, detailed analysis of layout differences, and/or transformation instructions.

6. The system of claim 1, wherein the processor is programmed to instruct the language model to treat elements with similar features as likely being the same element across the reference and target images, accounting for minor variations in color, lighting, or positioning that may result from layout parsing errors.

7. The system of claim 1, wherein the one or more edit captions describe modifications comprising removing, replacing, repositioning, or adding objects.

8. The system of claim 1, wherein the one or more edit captions describe one or more changes in spatial arrangement, scale, proportion, and/or hierarchy among elements.

9. The system of claim 1, wherein the one or more edit captions specify one or more contextual modifications to background, lighting, perspective, and/or time of day.

10. The system of claim 1, wherein the processor is programmed to provide the edit caption to a generative image model comprising a diffusion-based text-to-image synthesis architecture configured to apply the described transformation directly to the reference image and generate the target image.

11. A method for automatically generating edit captions based on layout representations, comprising:

accessing, by a processor, a reference layout representation associated with a reference image, the reference layout representation comprising textual data describing objects, spatial relationships, and hierarchical structures of the reference image;

accessing, by the processor, a target layout representation associated with a target image, the target layout representation comprising textual data describing objects, spatial relationships, and hierarchical structures of the target image;

providing, by the processor, the reference layout representation, the target layout representation, and a structured prompt to a language model, the structured prompt comprising one or more structured data fields having distinct categories of information to guide output of the language model;

executing, by the processor, the language model based on the reference layout representation, the target layout representation, and the structured prompt to: compare the reference layout representation with the target layout representation; identify semantic differences or correspondences between objects, spatial relationships, and contextual features of the reference image and the target image; and generate, based on the identified semantic differences or correspondences, at least one edit caption comprising natural language text that describes one or more transformations between the reference image and the target image that defines how one or more elements of the reference image are transformed to correspond to the target image.

12. A non-transitory computer readable medium storing instructions that, when executed on a processor, programs the processor to:

access a reference layout representation associated with a reference image, the reference layout representation comprising textual data describing objects, spatial relationships, and hierarchical structures of the reference image;

access a target layout representation associated with a target image, the target layout representation comprising textual data describing objects, spatial relationships, and hierarchical structures of the target image;

provide the reference layout representation, the target layout representation, and a structured prompt to a language model, the structured prompt comprising one or more structured data fields having distinct categories of information to guide output of the language model;

execute the language model based on the reference layout representation, the target layout representation, and the structured prompt to:

compare the reference layout representation with the target layout representation;

identify semantic differences or correspondences between objects, spatial relationships, and contextual features of the reference image and the target image; and generate, based on the identified semantic differences or correspondences, at least one edit caption comprising natural language text that describes one or more transformations between the reference image and the target image that defines how one or more elements of the reference image are transformed to correspond to the target image.

13. A system for automatically generating edit captions based on layout representations of reference images and a target image, comprising:

a processor programmed to:

access a first reference layout representation comprising first textual data describing objects, spatial relationships, and hierarchical structures of a first reference image and a second reference layout representation comprising second textual data describing objects, spatial relationships, and hierarchical structures of a second reference image;

access a target layout representation associated with a target image, the target layout representation comprising textual data describing objects, spatial relationships, and hierarchical structures of the target image;

provide the first layout representation, the second layout representation, the target layout representation, and a structured prompt to a language model, the structured prompt comprising one or more structured data fields having distinct categories of information to guide output of the language model;

execute the language model based on the first and second reference layout representations, the target layout representation, and the structured prompt to:

determine correspondences between objects, spatial relationships, and contextual features of the first reference image, the second reference image, and the target image; and generate, based on the determined correspondences, at least one edit caption comprising natural language text that describes how one or more first elements from the first reference image and one or more second elements from the second reference image are combined, repositioned, or transformed to form the target image.

14. The system of claim 13, wherein the processor is programmed to:

access a third reference layout representation comprising third textual data describing objects, spatial relationships, and hierarchical structures of a third reference image, wherein the at least one edit caption is generated to include natural language text that describes how one or more third elements from the third reference image are also combined, repositioned, or transformed with the one or more first and second elements to form the target image.

15. The system of claim 13, wherein the processor is programmed to generate at least a first edit caption and a second edit caption, the first edit caption and the second edit caption having different levels of detail with respect to one another.

16. The system of claim 13, wherein the processor is programmed to generate the structured prompt comprising: a system instruction for multi-reference editing, input image patch captions, an output image layout description, analytical reasoning data, a description of how input patches contribute to the output, transformation instructions without references, and transformation instructions with explicit patch references.

17. The system of claim 13, wherein the processor is programmed to generate transformation instructions without references that describe how elements from at least two of the reference images are repositioned or integrated into the target image without identifying specific source patches.

18. The system of claim 13, wherein the processor is programmed to generate transformation instructions with explicit patch references that specify, using tags, how particular elements of the target image correspond to elements from the reference images.

19. The system of claim 13, wherein the edit caption specifies spatial positioning of elements from the reference images in the target image, including relative placement, scale, and orientation of the elements.

20. The system of claim 13, wherein the processor is further programmed to store the edit caption together with the reference images and the target image to enable traceable attribution of visual elements of the target image to their respective source reference images.

\* \* \* \* \*